STATISTICAL ZERO TARGET RECOGNITION SYSTEM

Filed Jan. 29, 1965 10 Sheets-Sheet 1

INVENTORS.
RICHARD D. WILMOT,
DONALD A. MUCHLINSKI,
BY
Walter J. Adam
ATTORNEY.

STATISTICAL ZERO TARGET RECOGNITION SYSTEM

Filed Jan. 29, 1965 10 Sheets-Sheet 2

May 28, 1968 R. D. WILMOT ET AL 3,386,091

STATISTICAL ZERO TARGET RECOGNITION SYSTEM

Filed Jan. 29, 1965 10 Sheets-Sheet 7

United States Patent Office 3,386,091

Patented May 28, 1968

3,386,091
STATISTICAL ZERO TARGET RECOGNITION SYSTEM

Richard D. Wilmot, Fullerton, and Donald A. Muchlinski, Anaheim, Calif., assignors to Hughes Aircraft Company, Culver City, Calif., a corporation of Delaware Filed Jan. 29, 1965, Ser. No. 429,050
13 Claims. (Cl. 343—5)

ABSTRACT OF THE DISCLOSURE

The target recognition system described in this disclosure uses a statistical zero method which requires that a region surrounding a target be clear of any other video returns except those generated by noise before indicating a valid target. The system using a sliding window technique with all quantized video except the new data stored in a sweep map memory containing all of the video data in range over a selected azimuth size. At each range interval, a minimum hit criteria and a minimum zero criteria are used to determine the presence of a target or the presence of a clear area. Also, at each range interval, a minimum zero criteria is used to determine the presence of clear areas on either side in azimuth of the sliding window.

This invention relates to automatic target detection systems and particularly to a system that recognizes targets and rejects targets in an area in space as a function of the density and pattern of a target position and of the area surrounding the target position.

In an automatic detection, acquisition and track-while-scan surveillance radar system, a major problem is the automatic processing of all of the video returns (both valid and invalid target returns) derived from the rotating antenna. These digital detection, acquisition and track systems generally include a video quantizer, a target detector, a track correlator, a tracking computer, a computer memory and a track display console. All video signals that exceed the threshold level of the video quantizer are called a hit and those video signals that do not exceed the threshold level are called a miss. A valid target such as a moving aircraft is manually detected by an operator on a PPI (plan position indicator) scope by noting its video return pattern which is approximately one antenna beam width in azimuth and one pulse width in range and by noting its change in position from scan to scan. An automatic detection system identifies target tracks by sampling range bins (range intervals) and reporting a target indication when a minimum specified percentage of hits are found in any range bin. This type of statistical target determination is sensitive enough to allow targets to be detected that are not observable on a PPI scope. However, other video returns besides those from a valid target will satisfy the minimum hit criteria in any hange bin. Noise returns and returns from adjacent radar interference may generally be eliminated by scan to scan position correlation techniques. However, ground clutter, sea clutter, jamming and weather returns are of a type that are not eliminated by position correlation techniques. A particularly troublesome type of clutter is one that has a varying video hit density or small clouds located close together in a given area. Some automatic systems accept all of these returns and use a large computer and memory and a complex computer program to distinguish between valid and invalid target returns. This use of a large computer is relatively expensive and the memory is subject to saturation. Tests have shown that a typical "clean" radar environment would cause from 1000 to 1400 invalid video tracks to be generated per antenna scan and the presence of clouds would cause 400 invalid tracks per second to be generated. A very large memory and a high speed computer would be conventionally required to process this many tracks and to distinguish valid from invalid tracks.

The other approach is to screen the invalid tracks from the valid tracks before they are stored in the memory and processed by the computer. One method is to count the number of hits in an area in space and to prohibit (blank) automatic entry of tracks from any area that contains too many hits. This method has been found to be fairly effective but still generates on the average of 170 to 200 tracks per antenna scan with approximately 50 of these being valid tracks. Also, this arrangement is relatively complex and expensive to mechanize and has the disadvantage that there may be valid targets present in a blanked area. A simplified and reliable system that would eliminate returns from clutter while maintaining a criteria for recognizing valid targets would be highly desirable by allowing simplified and relatively small computers to be utilized for track-while-scan functions.

It is therefore an object of this invention to provide an improved radar target recognition system for distinguishing clutter returns from valid target returns.

It is another object of this invention to provide a target recognition system that combines both pattern analysis and hit density analysis.

It is still another object of this invention to provide a target detector system utilizing a statistical zero method which requires that a valid target be surrounded by a relatively clear area to reduce the number of spurious targets generated by an automatic video target detector.

It is a further object of this invention to provide a target recognition system that automatically eliminates signal returns from cloud or clutter areas of varying density.

It is a still further object of this invention to provide a target recognition system that may allow recognition of tightly spaced groups of moving craft.

Briefly, the target recognition system in accordance with the principles of the invention utilizes a statistical zero method which generally requires that the area or region surrounding a target be clear of any other video returns except those generated by noise. The system may utilize a sliding window technique in which all quantized video except the new data is stored in a sweep map store memory containing all of the video information in range over a selected azimuth size as required for the sliding window and areas in azimuth on both sides thereof. During each range sweep of the radar system, a new bit is entered into the sweep map memory and the oldest bit is shifted out in each range bin interval. A minimum hit criteria $E_0$ is determined by sampling the bits in the sliding window. When the number of hits exceeds the predetermined threshold number of hits per sample, a minimum hit criteria is satisfied which indicates that a target may be present. A zero hit criteria then samples the areas or regions in azimuth over a predetermined number of range sweeps to determine if the area before and after the target in azimuth is clear. To sample in range, a $K_0$ criteria or a selected number of zeros is detected in the sliding window over a predetermined number of range sweep intervals at a lesser range and a greater range than the target indicated by the $E_0$ criteria. Storage devices such as flip-flops retain the $K_0$ information of previous range bin samples. Also in accordance with the invention, one of the criteria in range may be eliminated to allow recognition of a number of closely grouped moving targets.

The novel features of this invention, as well as the invention itself, both as to its organization and method of operation, will best be understood from the accompanying description, taken in connection with the accompanying drawings, in which like reference characters refer to like parts, and in which.

Figure 1:
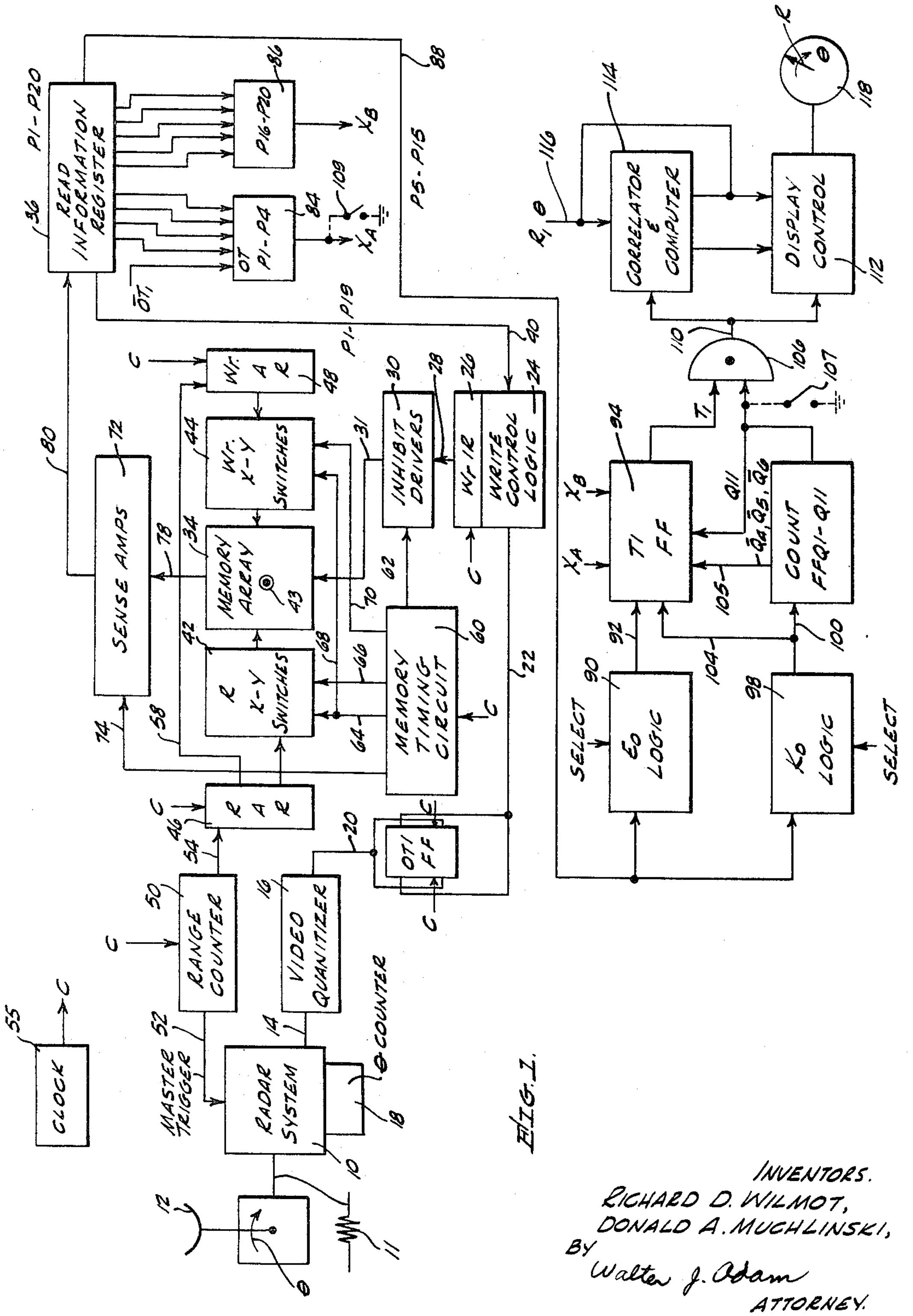
FIG. 1 is a schematic block diagram showing a statistical zero target detection system in accordance with the principles of the invention.

Referring first to FIG. 1, the automatic video target detection system in accordance with the principles of the invention includes a radar system 10 having a rotating surveillance antenna 12 controlled thereby for rotating continuously through a repetitive angle $\theta$ of 360°. The radar system 10 applies pulses of energy of a waveform 11 to the antenna 12 for transmission into space with reflected energy from targets and clutter being intercepted by the antenna 12 and applied to the radar system 10 for processing. Suitable trigger circuits, microwave processing elements and IF mixing arrangements are included in the radar system 10 which applies a video signal to a lead 14 and to a video quantizer 16 which during each repetitive range bin interval, develops a binary "one" when the video level is above a selected threshold level and develops a binary "zero" when the video level is below the selected threshold level. The radar system may also include a $\theta$ counter 18 which develops a binary number representative of the angle $\theta$ as the antenna 12 rotates.

The quantized video bit in binary form representing a hit or a miss in the present range count interval is applied from the quantizer 16 through a composite lead 20 to an on time flip-flop OT1 from which the binary hit signal is applied through a composite lead 22 to a write control logic circuit 24. The digital information is passed through the control logic circuit 24 to a write information register 26 which may include 20 flip-flops PW1–PW20, for example, and through a composite lead 28 to an inhibit driver circuit 30. The other nineteen bits of the information to be written into a memory array 34 are applied from a read information register 36 through a composite lead 40 to the write control logic circuit 24. The read register 36 may include 20 flip-flops designated P1 to P20. During each write operation, the bit from the oldest range sweep interval of flip-flop P20 is not shifted into the write register 26 and the new bit from the OT1 flip-flop is written into memory. Also during writing, the bits from flip-flops P1 to P19 are shifted to positions PW2 to PW20 in the write register 26 and the bit from the OT1 flip-flop is transferred to flip-flop PW1 of the write register 26. The memory system also includes read X–Y switches 42, write X–Y switches 44, a read address register 46 and a write address register 48. The memory array 34 may include 1024 word positions, each including twenty cores such as 43. The addressing of the word positions of the memory array 34 is provided by the binary count developed in a range counter 50 which may be a Mod 1024 counter. The pulses of the waveform 11 are initiated by a master trigger signal developed by the range counter 50 at the start of the count and applied thereto on a lead 52. Suitable gating and delay arrangements (not shown) may be provided in the counter 50 to develop the master trigger signal. The range address is applied from the counter 50 through a composite lead 54 to the read address register 46 during a first memory clock period and during the following memory clock period is applied from the read address register 46 through a lead 58 to the write address register 48. Thus, in the illustrated memory arrangement operating with a conventional read-write cycle during each range count, reading is performed at a first memory address ($n$) and writing is performed at a different memory address being the next sequentially lower address ($n-1$) as developed by the range counter 50 and the read and write address registers 42 and 48. The memory system operates in response to a system clock 55 which applies clock signals C to a memory timing circuit 60 to develop appropriate internal timing and clock signals as will be explained in further detail subsequently. The clock pulses C are also applied to the flip-flops of the counters and registers throughout the system. Timing signals are applied from the timing circuit 60 to the inhibit driver circuit 30 through a lead 62, to the read X–Y switches 42 through leads 64 and 66, to the write X–Y switches 44 through leads 68 and 70 and to a sense amplifier circuit 72 through a lead 74. During reading from the memory system, the sense amplifiers 72 respond to a strobe or timing signal on the lead 74 to pass signals applied from the memory array 34 on a composite lead 78 to the circuit 72, through a composite lead 80 to the flip-flops of the read information register 36. The read information register 36 which may include 20 flip-flops, for example, stores for one system clock period or range count period, each word read from the memory array 34 representing the quantized video at one range bin over the stored width of the selected sample in azimuth which is twenty range sweeps, in the illustrated example. The contents of the OT1 flip-flop are also utilized during each range count with the word read from memory to complete the sample width in azimuth. To determine that clear areas are provided in azimuth on both sides of a detected target area which may be eleven range sweeps in azimuth, for example, circuits 84 and 86 respond to the bits as stored in flip-flops OT1 and P1 through P4 and to the bits stored in flip-flops P16 through P20 stored in the information register 36 to develop signals $X_A$ and $X_B$ which are respectively true when the area before and after the target in azimuth meets a selected statistical zero criteria.

For detecting the presence of a target, the quantized video of word positions represented by flip-flops P5 through P15 as stored in the read information register 36 is applied through a composite lead 88 to an $E_0$ logic circuit 90 which in response to a selected value of hit density criteria passes a signal through a lead 92 to a target or T1 flip-flop 94. For determining if the criteria at each clock time for zeros or the absence of a target is met, a $K_0$ logic circuit 98 responds to the signals from flip-flops P5 through P15 on the lead 88 to apply a signal through a lead 100 to a counting circuit 102 containing flip-flops Q1 to Q11 and responding to the occurrence of the statistical requirement in range. A signal is also applied from the $K_0$ logic circuit 98 to the T1 flip-flop 94 through a lead 104. The T1 flip-flop also responds to the signals $X_A$ and $X_B$ and to signals $\overline{Q}_4$, $\overline{Q}_5$ and $\overline{Q}_6$ on a lead 105 to apply a true signal $T_1$ to an "and" gate 106 when the statistical zero and the target criteria is met in azimuth. When the flip-flop Q11 is set true, the criteria in range has been satisfied and the signals from the flip-flop Q11 are applied to the "and" target gate 106 to apply a target signal through a lead 110 to a display control circuit 112 and to a correlator and computer 114. Range signals R and azimuth signals $\theta$ (in real time) are both applied from the radar system 10 through a lead 116 to the correlator and computer 114 and to the display control 112. A display screen 118 which may be the face of a conventional cathode ray tube responds to the display control circuit 112 to continuously sweep in range through the azimuth angle $\theta$ and provide indications of valid targets over the surveillance area.

Figure 10:
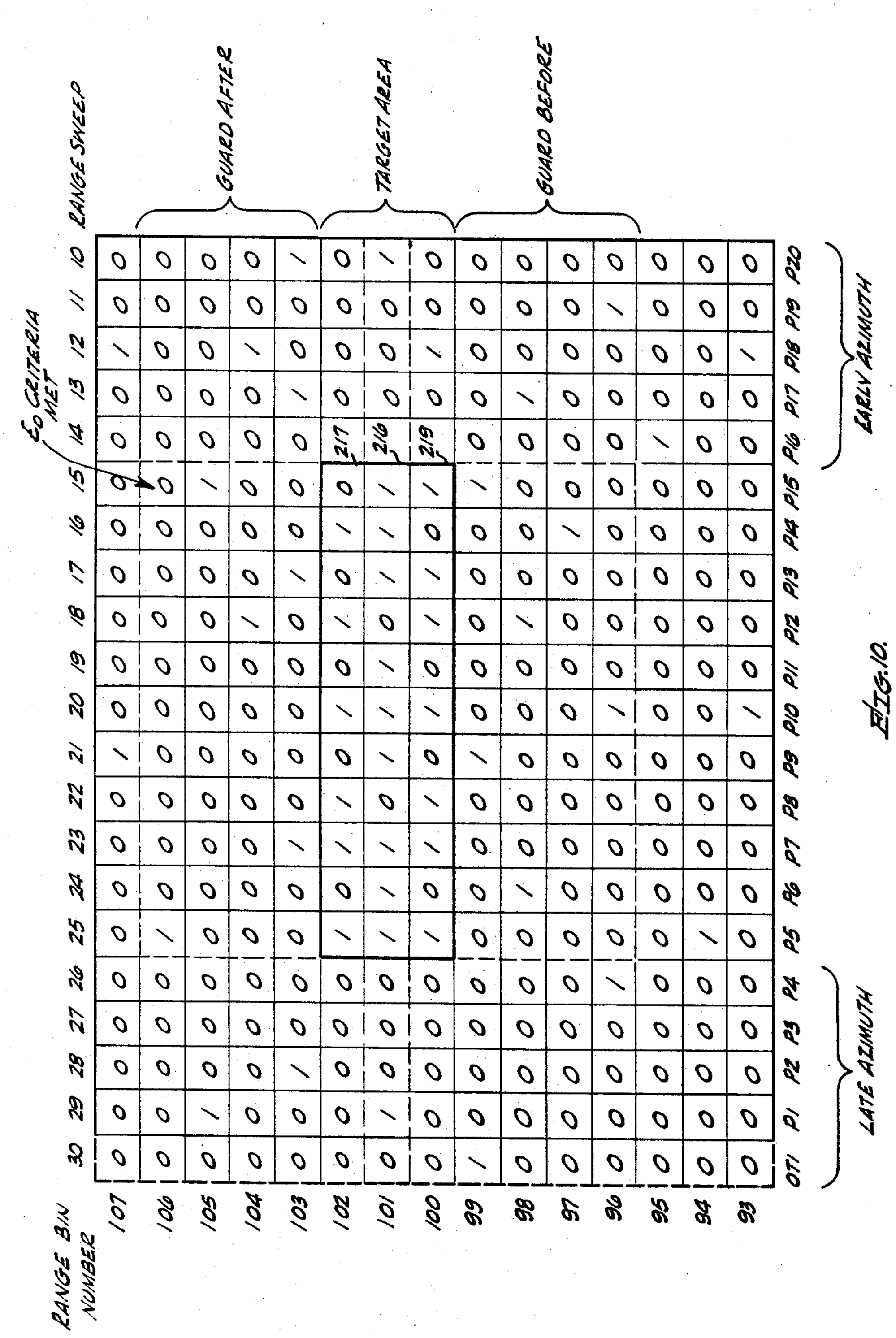
FIG. 10 is a schematic diagram showing the quantized video as stored in the memory of FIG. 1 over the total azimuth memory storage interval and a portion of the total range storage interval.
Figure 13:
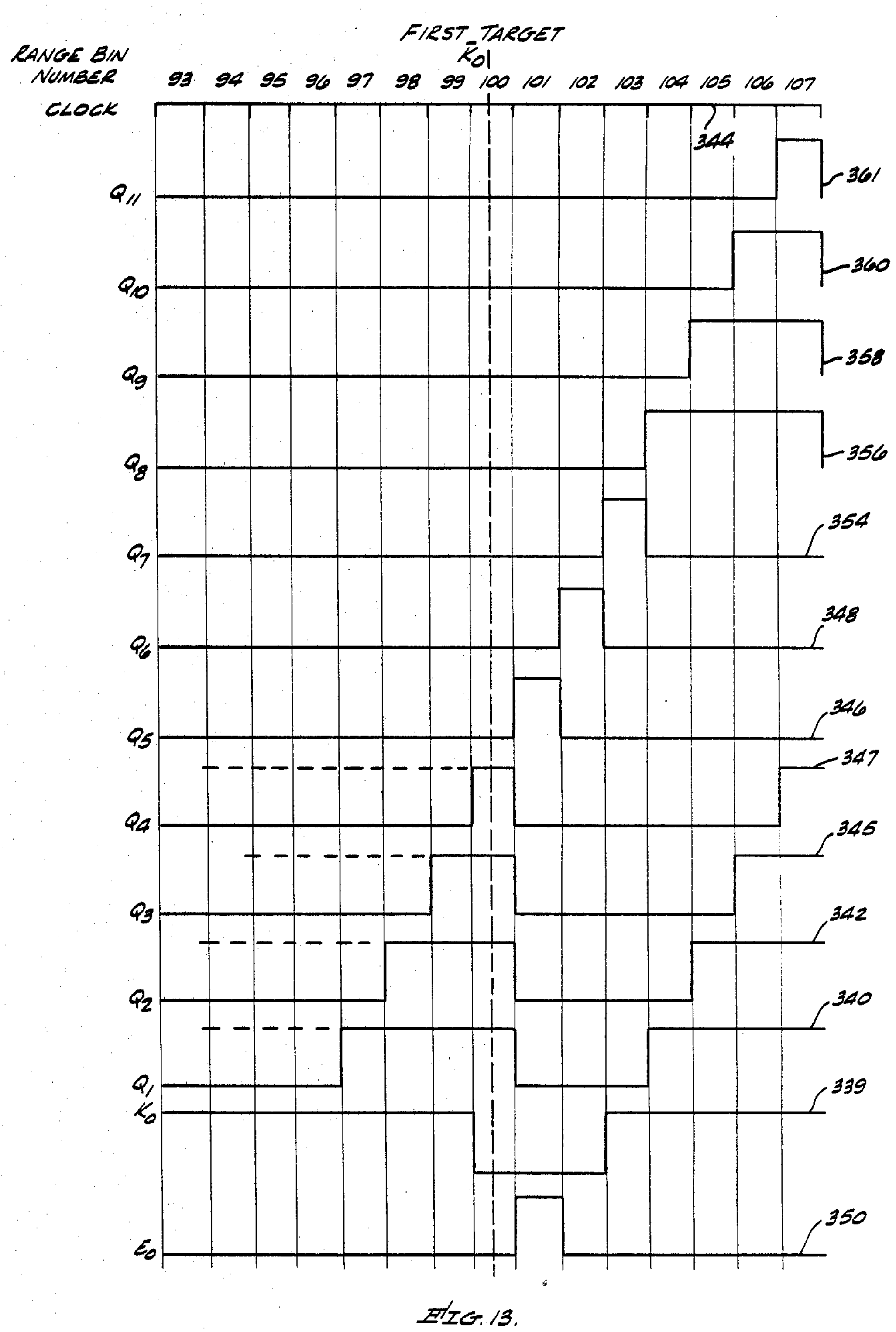
FIG. 13 is a schematic diagram of waveforms of voltage amplitude as a function of range bin interval time for explaining the operation of the count flip-flops responding to selected criteria in azimuth as shown in FIG. 10.

Referring temporarily to FIG. 10, a portion of the word storage positions of the sweep map memory array 34 is shown with each stored word being 20 bits in length. The memory 34 may include 20 cores to store each word which is arranged horizontally in FIG. 10 and represents azimuth over the width of twenty transmitted beams. The dotted colum designated OT1 is shown to illustrate that the contents of the OT1 flip-flop is utilized during each range bin interval for determining if the clear area azimuth statistical criteria are met. The vertical columns each represent the quantized video returns from a different range sweep, that is, the twenty columns represent the quantized return from each twenty transmitted pulses. At each position in azimuth or range sweep, the total surveillance range is divided into range bins which may be 1024, for example, with a word corresponding to each range bin. At each clock time a word of sequentially greater address corresponding to a greater range is addressed by the range counter 50 and the quantized video return of a "zero" or a "one" for that range count is recorded into the core corresponding to position P1 from the OT1 flip-flop. One bit in the read register 36 of flip-flop P20 from twenty previous range sweep intervals is not written into the selected word position of the memory and is destroyed and the bits in flip-flops P1 to P19 are shifted one position to the right. At the termination of the total range count, the address changes to a zero range count at the 0 range bin and develops the master trigger signal. The illustrated portion of the sweep map shows an example of quantized video returns from range bins or word 93 to 107 for illustrating the detection of a valid target which occurs in space in that range interval and over range sweeps 10 to 30. For a target detection criteria of 9 out of 11 hits, the word at the range bin 101 included in a sliding window 216 represents a condition at which the $E_0$ criteria is satisfied by the $E_0$ logic circuit 90 set for a 9 out of 11 statistical hit criteria. The $K_0$ criteria which may be 6 out of 11 zeros is met at the azimuth position of the sliding window 216 by the $K_0$ logic circuit 98 in the range bins 96 to 99 and in the range bins 103 to 106 respectively representing the guard before and the guard after areas in range. For meeting the zero criteria in the late azimuth direction, the azimuth positions OT1 and P1 through P4 meet the 3 out of 5 zero criteria as determined by the azimuth criteria circuit 84. For meeting the zero criteria in the early azimuth direction, the azimuth positions P16 through P20 meet the 3 out of 5 zero criteria as determined by the azimuth criteria circuit 86. It is to be noted that the sliding window 216 remains in the position shown and the bits are shifted from left to right with new bits at each range bin being entered into the word positions from the OT1 register. The target criteria in the sliding window 216 is satisfied in the example during range sweep 30 by responding to the contents of flip-flops P5 to P15. Sliding windows 217 and 219 are also functional so that the target area extends over three range bin intervals as will be explained subsequently relative to FIG. 13.

Figure 2:
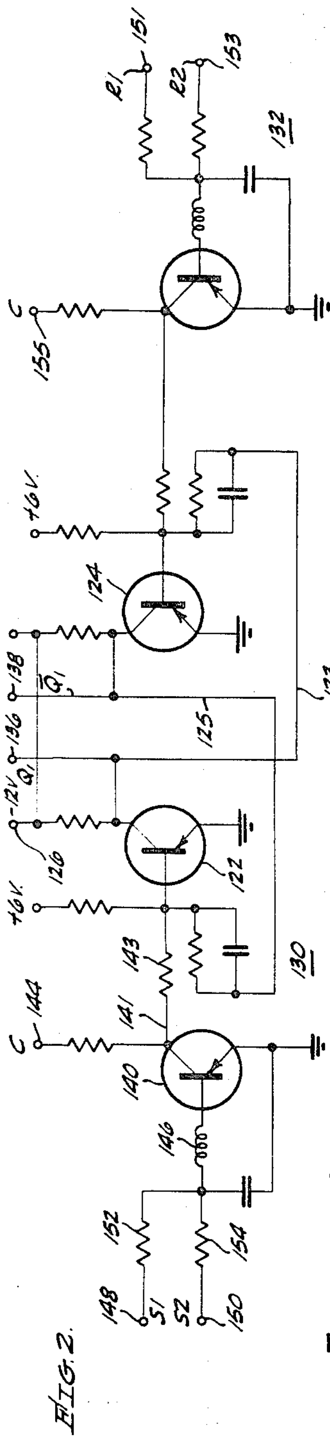
FIG. 2 is a schematic circuit diagram of a typical flip-flop that may be utilized in the system of the invention.
Figure 3:
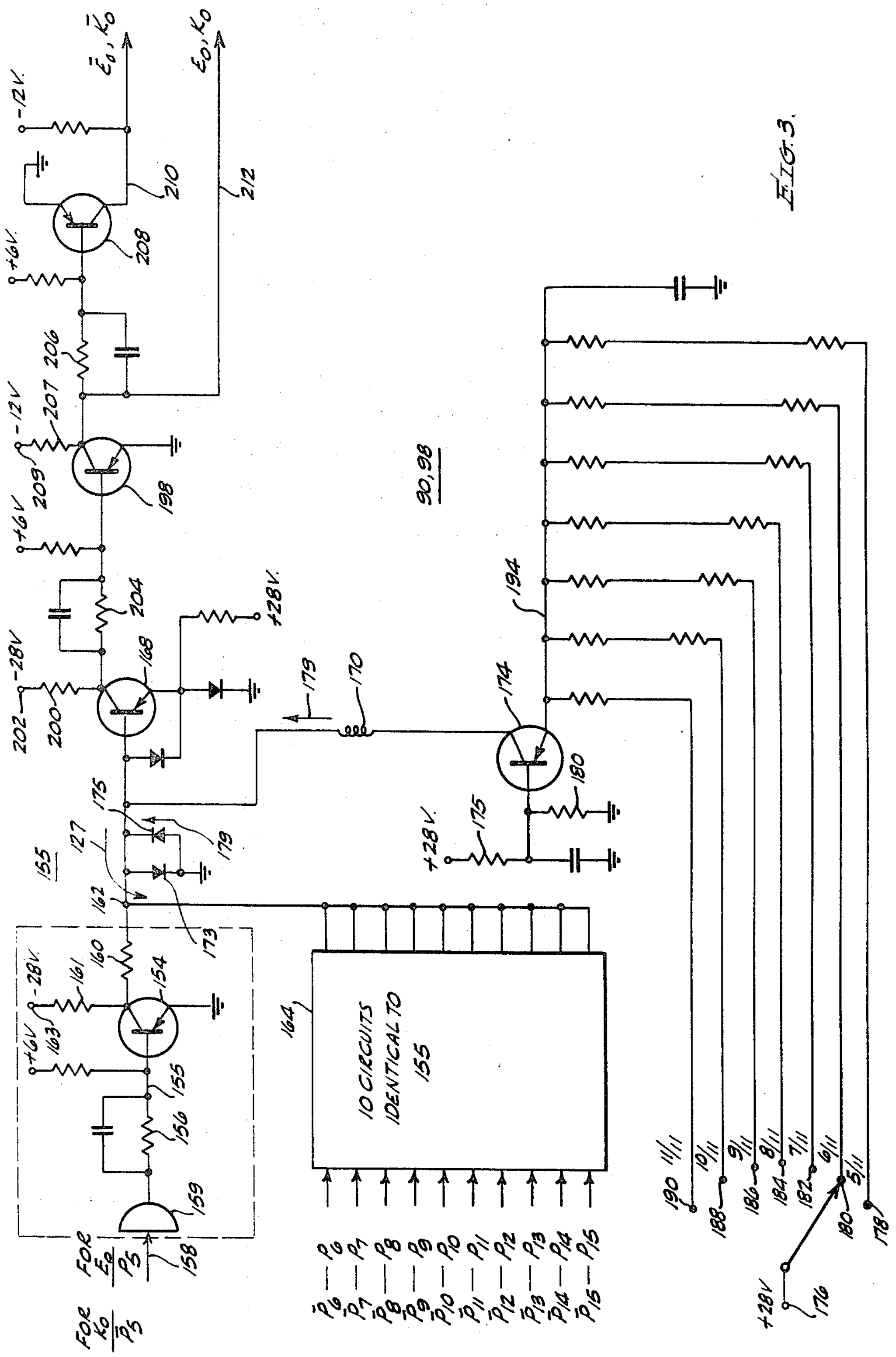
FIG. 3 is a schematic diagram of a circuit for forming the $E_0$ or minimum hit criteria in azimuth for determining the presence of a target at each range interval and the $K_0$ or minimum number of zeros criteria in azimuth for determining the presence of clear areas in range for the system of FIG. 1.

Before further explaining the operation of the system of FIG. 1, the flip-flop of FIG. 2 will be explained for illustrating a typical flip-flop that may be utilized in accordance with the principles of the invention. The flip-flop of FIG. 2 which may respond to signals at a ground level for a true signal and at a −8 volt level for a false signal, functions in response to NAND (not and) logic for purposes of explanation. However, it is to be understood that the principles in accordance with the invention are applicable to other types of logical arrangements such as "and" and "or" logic or NOR logic. The flip-flop includes transistors 122 and 124 of the pnp type having emitters coupled to ground, collectors coupled through appropriate resistors to a −12 volt terminal 126 and bases coupled to respective input gates 130 and 132. The collector of the transistor 122 is cross coupled through a lead 123 to the base of the transistor 124 and the collector of the transistor 124 is cross coupled through a lead 125 to the base of the transistor 122 with the true output being applied from the collector of the transistor 122 to a terminal 136 and the false output being applied from the collector of the transistor 124 to a terminal 138. For example, if the flip-flop of FIG. 3 is designated Q1, the true and false output signals may be respectively designated Q1 and $\overline{Q_1}$. The input gates 130 and 132 each include a transistor such as 140 of the gate 130 having an emitter coupled to ground and a collector coupled through a lead 141 and a resistor 143 to the base of the transistor 122 as well as through a suitable resistor to a source of clock pulses at a terminal 144. To provide an anti-race characteristic, an inductor 146 is coupled between the base of the transistor 140 and a pair of input terminals 148 and 150 through respective resistors 152 and 154. Because the gate 130 functions as a NAN gate, two true or ground potential signals applied to the terminals 148 and 150 maintain the transistor 140 nonconductive so that a negtive clock pulse at the terminal 144 biases the transistor 122 into conduction to apply a ground or true signal to the true output terminal 136. Similarly, if a false signal of −8 volts is applied to either or both of the terminals 148 and 150, the transistor 140 is biased into conduction and a true or substantially ground level signal is applied to the base of the transistor 122 to maintain that transistor biased out of conduction. A clock signal on the terminal 144 is passed to ground and the flip-flop is not set to the true state. The gate 312 operates in a similar manner in response to two true signals applied to terminals 151 and 153 and a clock pulse at a terminal 155, to apply a ground or true signal to the false terminal 138. Because of the cross coupling of the flip-flop, only one transistor 122 or 124 is conductive at each state as the flip-flop is set from the terminals 148 and 150 or reset from the terminals 151 and 153. For operation of the flip-flop of FIG. 2 in the read information register 36, the count register 102, the read address register 46, the write address register 48 and the write information register 26, the flip-flop of FIG. 2 may operate with signals applied to the two input gates 130 and 132 and with the output signals derived from the two output terminals 136 and 138. However, for operation in the read information register 36, the terminals 148, 150, 151 and 153 may be coupled to ground, the terminal 136 may be coupled to the sense amplifier 72 and the clock pulse C may be applied only to the terminal 155 for resetting the flip-flop. Thus for operation in the read register, the flip-flop is set between clock pulses and is reset at the next negative clock pulse.

A typical NAND gate that may be utilized in the system of the invention is the gate 130 with the terminal 144 coupled to −8 volts and with the lead 141 being the output terminal. Thus, two true signals applied to the terminals 148 and 150 maintain the transistor 140 biased out of conduction and a −8 volt or false signal on the lead 141 while a false or −8 volt signal applied to one or both of the input terminals biases the transistor 140 into conduction and applies a true signal to the lead 141.

Referring now to FIG. 3, a circuit which may be utilized both for the $E_0$ logic circuit 90 and for the $K_0$ logic circuit 98 includes a pnp type transistor 154 of a circuit 155 having an emitter coupled to ground, having a base coupled through a resistor 156 and an inverting gate 159 to a lead 158 of the composite lead 88 (FIG. 1) for responding to the signal $P_5$ as stored in the read information register 36 and having a collector coupled through a resistor 160 to a lead 162 which functions as a summing point. The collector of the transistor 154 is also coupled through a resistor 161 to a suitable source of potential such as a −28 volt terminal 163. Ten additional circuits similar to the circuit 155 indicated by a box 164 each respond to a different one of signals $P_6$ to $P_{15}$ to bias a transistor similar to 154 into conduction for decreasing the current passing thereto from the lead 162 when a true signal $P_6$ to $P_{15}$ is applied thereto. For operation as a $K_0$ logic circuit, the signal $\overline{P_5}$ is applied to the lead 158 and signals $\overline{P_6}$ to $\overline{P_{15}}$ are applied to similar leads of the circuit 164. The lead 162 is coupled to the base of a pnp type transistor 168 as well as through the anode to cathode path of a diode 173 to ground for being biased into conduction when the $E_0$ or $K_0$ criteria is met and through the cathode to anode path of a diode 175 to ground for passing current through resistors such as 161 when the $E_0$ or $K_0$ criteria is not met. The lead 162 is also coupled through an inductor 170 to the collector of a pnp type transistor 174. For providing selection of either the $E_0$ or $K_0$ criteria as determined by the signals applied to the input leads such as 158, a terminal 176 coupled to a suitable source of potential such as +28 volts is selectably applied to terminals 178, 180, 182, 184, 186, 188 or 190 to respectively apply a current signal through suitable resistors of respectively increasing resistive value to a lead 194 and to the emitter of the transistor 174. The base of the transistor 174 is coupled through a resistor 175 to +28 voltage supply as well as through a resistor 180 to ground for biasing the transistor to be maintained in a conductive state. The terminals 178, 180, 182, 184, 186, 188 and 190 respectively provide an $E_0$ or $K_0$ criteria of 5, 6, 7, 8, 9, 10 and 11 hits or zeros out of 11 range bin samples in azimuth. When the current of an arrow 179 is less than the current that will pass through all resistors such as 161, that is, the transistors such as 154 are nonconductive for the abence of a hit, the diode 175 is biased into conduction as shown by an arrow 179 to supply current to the circuits 155 and 164. When the hit criteria is met, that is, a sufficient number of the transistors such as 154 are biased into conduction, the potential on the lead 162 rises to bias the diode 173 into conduction as shown by an arrow 177 and the transistor 168 is biased out of conduction. Thus, depending upon the criteria selected at the terminals 178, 180, 182, 184, 186, 188 and 190 such as 9 out of 11 hits at the terminal 186, a current of the arrow 179 requires the corresponding number of true signals to be applied to the leads such as 158 for the criteria to be met, the diode 173 being biased into conduction when 9 true signals of $P_5$ to $P_{15}$ for the circuit 90 and $\overline{P_5}$ to $\overline{P_{15}}$ for the circuit 98, bias 9 transistors such as 154 into conduction. Thus when the sum signal on the lead 162 falls to a sufficiently low level as determined by the selected criteria, the transistor 168 is biased out of conduction to apply a negative signal to the base of a transistor 198 for biasing that transistor into conduction. The collector of the transistor 168 is coupled through a ressitor 200 to a −28 volt terminal 202 and is coupled through a resistor 204 to the base of the transistor 198. The collector of the transistor 198 is coupled through a resistor 206 to the base of a transistor 208 and through a resistor 207 to a terminal 209 of a suitable potential such as −12 volts. The transistor 208 has an emitter coupled to ground and a collector coupled to a lead 210 to which is applied the signals $\overline{E_0}$ and $\overline{K_0}$ at a true level when the target detection criteria is not met for the $E_0$ logic circuit 90 and when the zero criteria is not met for the $K_0$ logic circuit 98. The collector of the transistor 198 is also coupled to a lead 212 to which is applied the target detection criteria signal $E_0$ when the circuit functions as the $E_0$ logic circuit 90 and to which is applied the signal $K_0$ when the circuit functions as a $K_0$ logic circuit 98.

Figure 4:
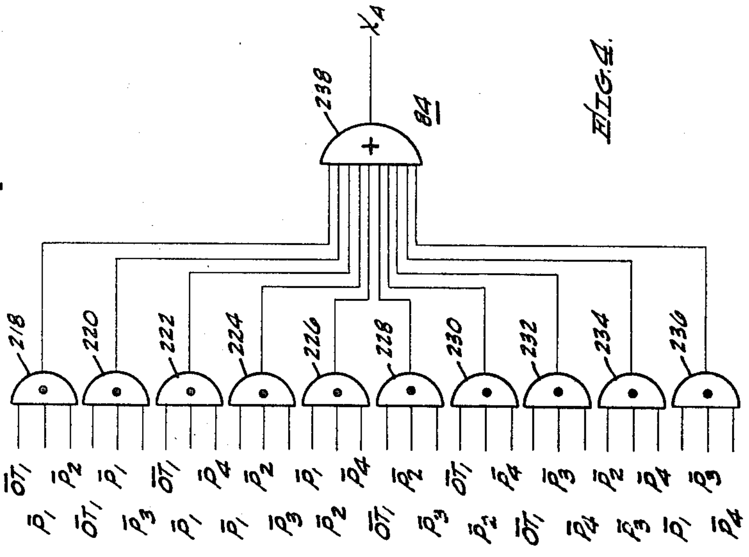
FIG. 4 is a schematic circuit and block diagram of a circuit for developing the zero or clear area criteria in azimuth.

Referring now to FIG. 4, the trailing edge or late window criteria circuit 84 (FIG. 1) responds to the OT1 flip-flop and to the flip-flops P1 through P4 of the read information register 36 to develop the signal $X_A$ in the true state when a predetermined criteria of 3 zeros out of 5 samples in azimuth is met. Gates 218, 220, 222, 224, 226, 228, 230, 232, 234 and 236 which may be NAND gates functioning as "and" gates, apply signals to a NAND gate 238 which functions as an "or" gate to develop the signal $X_A$. The signals applied to the gates 218 through 236 to develop the signal $X_A$ may be expressed by the following logical equation:

$$X_A=\overline{OT_1}\,\overline{P_1}\,\overline{P_2}+\overline{OT_1}\,\overline{P_1}\,\overline{P_3}+\overline{OT_1}\,\overline{P_1}\,\overline{P_4}+\overline{P_1}\,\overline{P_2}\,\overline{P_3}+\overline{P_1}\,\overline{P_2}\,\overline{P_4}+\overline{OT_1}\,\overline{P_2}\,\overline{P_3}+\overline{OT_1}\,\overline{P_2}\,\overline{P_4}+\overline{OT_1}\,\overline{P_3}\,\overline{P_4}+\overline{P_2}\,\overline{P_3}\,\overline{P_4}+\overline{P_1}\,\overline{P_3}\,\overline{P_4}$$

The leading edge or early window criteria $X_B$ of the circuit 86 (FIG. 1) is developed by an arrangement similar to that of FIG. 4 and may be expressed by the following logical equation:

$$X_B=\overline{P_{16}}\,\overline{P_{17}}\,\overline{P_{18}}+\overline{P_{16}}\,\overline{P_{17}}\,\overline{P_{19}}+\overline{P_{16}}\,\overline{P_{17}}\,\overline{P_{20}}+\overline{P_{17}}\,\overline{P_{18}}\,\overline{P_{19}}+\overline{P_{17}}\,\overline{P_{18}}\,\overline{P_{20}}+\overline{P_{16}}\,\overline{P_{18}}\,\overline{P_{19}}+\overline{P_{16}}\,\overline{P_{19}}\,\overline{P_{20}}+\overline{P_{16}}\,\overline{P_{19}}\,\overline{P_{20}}+\overline{P_{18}}\,\overline{P_{19}}\,\overline{P_{20}}+\overline{P_{17}}\,\overline{P_{19}}\,\overline{P_{20}}$$

Figure 5:
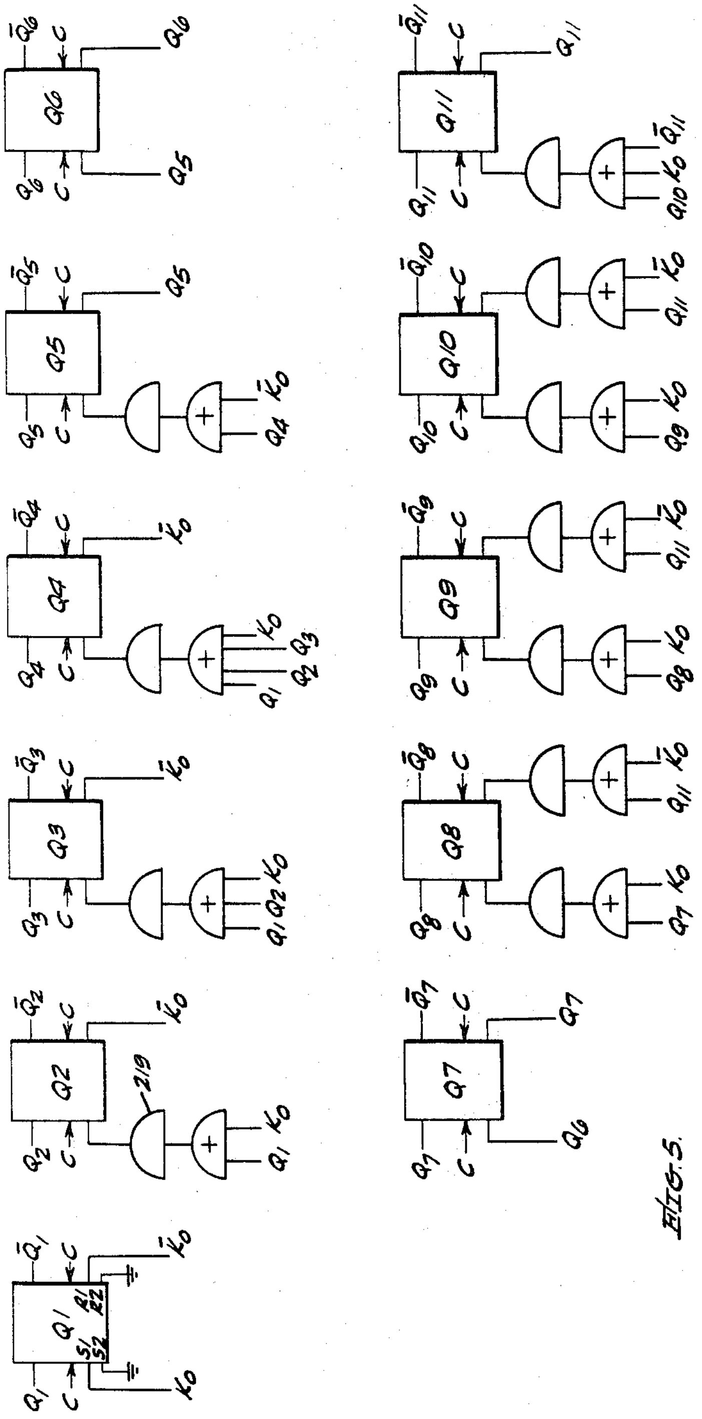
FIG. 5 is a schematic circuit and block diagram of the count register utilized in the system of FIG. 1 for being responsive to the minimum hit and the zero criteria at each range interval to control a valid target indication.

Referring now to FIG. 5, the azimuth counter flip-flops Q1 to Q11 of the circuit 102 of FIG. 1 are set in response to the states of range bins 96 to 106 (FIG. 10). It is to be noted at this time that the flip-flops Q1 to Q4 may be set at range bin intrevals earlier in time than bins 96 to 99. Each flip-flop Q1 to Q11 which may be similar to that shown in FIG. 2 includes logical NAND gates functioning as "and" gates at the input terminals. For example, the flip-flop Q1 is set to the true state in response to the signal $K_0$ being applied thereto in the true or ground level state at clock time C and is set to the false state in response to the signal $\overline{K_0}$ being applied thereto in the true or ground state at clock time. It is to be noted that the unused input terminals such as the set terminal S2 and the reset terminal R2 as indicated in FIG. 2 are coupled to ground when not being utilized such as shown at flip-flop Q1. The system clock signal is applied to each of the flip-flops as explained relative to FIG. 2. Because of the NAND logic, the output signal from a NAND gate functioning as an "and" gate is inverted in gates such as 219 at flip-flop Q2 before being applied to the input terminal. The logical expressions for setting the flip-flop Q1 to Q11 as shown in FIG. 5 may be expressed as:

$$SQ1=K_0$$
$$RQ1=\overline{K_0}$$
$$SQ2=Q1\cdot K_0$$
$$RQ2=\overline{K_0}$$
$$SQ3=Q1\cdot Q2\cdot K_0$$
$$RQ3=\overline{K_0}$$
$$SQ4=Q1\cdot Q2\cdot Q3\cdot K_0$$
$$RQ4=\overline{K_0}$$
$$SQ5=Q4\cdot\overline{K_0}$$
$$RQ5=Q5$$
$$SQ6=Q5$$
$$RQ6=Q6$$
$$SQ7=Q6$$
$$RQ7=Q7$$
$$SQ8=Q7\cdot K_0$$
$$RQ8=Q11+\overline{K_0}$$
$$SQ9=Q8\cdot K_0$$
$$RQ9=Q11+\overline{K_0}$$
$$SQ10=Q9\cdot K_0$$
$$RQ10=Q11+\overline{K_0}$$
$$SQ11=Q10\cdot K_0\cdot\overline{Q11}$$
$$RQ11=Q11$$

It is to be noted that although the clock term C has been omitted from each of the above terms for convenience of expression, the flip-flops are set and reset at the clock pulse.

Figure 6:
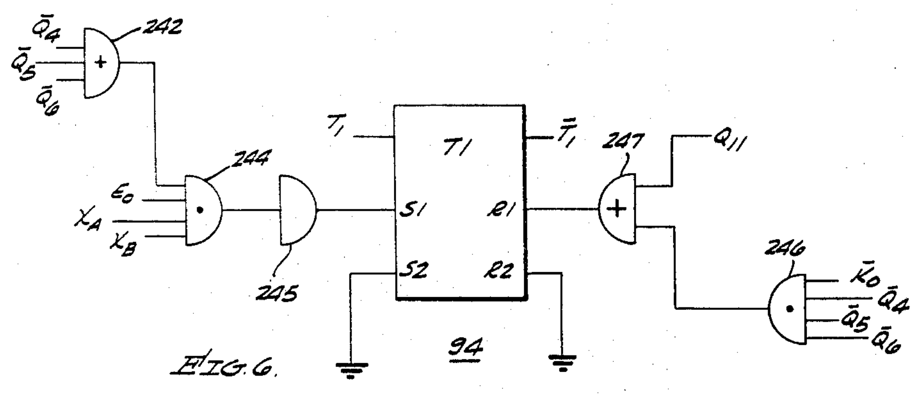
FIG. 6 is a schematic diagram of the target flip-flop T1 utilized in the system of FIG. 1 for controlling a valid target indication.

Referring now to FIG. 6, the target detector flip-flop T1 of FIG. 1 is set true when the $E_0$ criteria is satisfied, $X_A$ and $X_B$ are true representing clear areas in azimuth, and either $Q_4$, $Q_5$ or $Q_6$ is true indicating that there is a clear area before the target in range. Gates 242 and 244 respectively functioning as an "or" gate and an "and" gate set the flip-flop T1 after passing the signal through an inverter 245. The flip-flop T1 is reset when a valid target condition is met $(Q_{11})$ or an invalid target condition is present as a result of $\overline{K_0}$ being true and the absence of a guard area in the range dimension. A gate 246 functioning as an "and" gate and a gate 247 functioning as an "or" gate reset the flip-flop T1. The logical expressions for setting and resetting the flip-flop T1 are:

$$ST1=(E_0)\cdot[X_AX_B(Q_4+Q_5+Q_6)]$$
$$RT1=(Q11)+(\overline{K_0})(\overline{Q_4+Q_5+Q_6})$$

The first sum of the reset expression is true in response to a valid target being detected and the last sum of the reset term is true in response to detection of an invalid target. The valid target gate 106 of FIG. 1 indicating that the criteria is satisfied in azimuth and the before guard area criteria is met, responds to the T1 flip-flop being in a true state and to the Q11 flip-flop of the counter 102 being true indicating that the after guard area criteria in range is satisfied. When the valid target gate 106 is opened, a signal is passed to the display and to the correlator and computer. The logical expression for closing the valid target gate is:

$$X_{VT}=(T_1)(Q_{11})$$

Referring now to FIG. 10 as well as to FIG. 1, the shift logic utilized for writing information into each addressed word of the memory from the read register 36 will be explained in further detail. The contents of the OT1 flip-flop and the data from flip-flops P1 to P19 are utilized during each range bin interval and the data from flip-flop P20 is shifted out and destroyed. Thus in FIG. 10 the information P1 to P20 is shown recorded in the memory prior to being read into the read register 36. The position of the sliding windows 216, 217 and 219 is that for determining the criteria at the time when the current OT1 data is present in the OT1 flip-flop and the data P1 to P20 is read into the flip-flops of the read register 36. The data read into the P20 flip-flop of the register 36 is not transferred to the write information register 26. The data in flip-flops P1 to P19 is clocked into the write information register 26 at respective positions PW2 to PW20 and the OT1 data is clocked therein at position PW1 for being written into memory during the next range bin interval. Thus by utilizing the present contents of the OT1 flip-flop for statistical azimuth criteria determination, only 20 bits of storage are required for each word of memory. The write control logic circuit 24 for controlling data to be written into the 20 flip-flops of the write register 26 may be expressed as:

$$SPW1=OT_1$$
$$RPW1=\overline{OT_1}$$
$$SP_{2-20}=P_{1-19}$$
$$RP_{2-20}=\overline{P_{1-19}}$$

Figure 7:
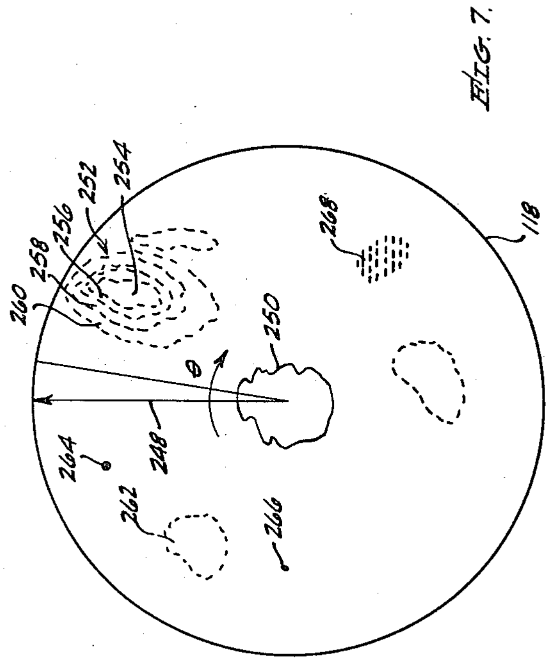
FIG. 7 is a schematic diagram of the screen of the display scope as used in the system in accordance with the invention.

Referring now to FIG. 7, the display screen 118 is shown with some of the clutter and target conditions that may exist in space being dotted for illustrating the invalid target rejection operation of the system of the invention. During each range sweep as indicated by a line 248, the video return signals are quantized in the 1024 range bins or intervals which may each be ¼ mile, for example. The radar antenna 12 of FIG. 1 and the radial path of the electron beam continually rotates through the angle $\theta$ and may provide 3600 range sweeps during each 360 degrees of rotation for a scan period of 10 seconds and a P.R.F. of 360. Clutter of a region 250 which may be from ground return has a relatively high density in both range and azimuth so that the zero leading and trailing edge criteria and the zero guard area before and guard area fater criteria are not met. It is to be noted that at the edge of the clutter region 250, the $X_A$ and $X_B$ criteria and guard area after criteria in range may be met but the guard area before criteria is not satisfied so that the flip-flops Q1 to Q4 (FIG. 1) are not set to allow a valid target signal to be applied to the lead 110. A clutter condition 252 may be an area of small clouds 254 of a relatively high density surrounded by an area 256 of relatively low density, an area 258 of relatively high cloud density and an area 260 of relatively low density cloud structure. Because of the zero azimuth and range criteria, a target is not indicated by the cloud structures 252, 254, 256, 258 and 260 as the density of hits in the area surrounding a potential target is greater than the $K_0$, $X_A$ and $X_B$ criteria. A cloud structure 262 may have a width in azimuth of over 2 range sweeps so a valid target signal is not developed therefrom. Valid targets 264 and 266 are displayed on the face of the scope. A cluster of aircraft 268 is also rejected by the statistical zero criteria of the invention because no single target is surrounded by a sufficiently large clear area. It is to be noted that in accordance with the principles of the invention, the leading edge of the cluster of moving crafts 268 may be detected by observing or detecting the motion and eliminating the guard area after criteria, for example, in the system of FIG. 1.

Figure 8:
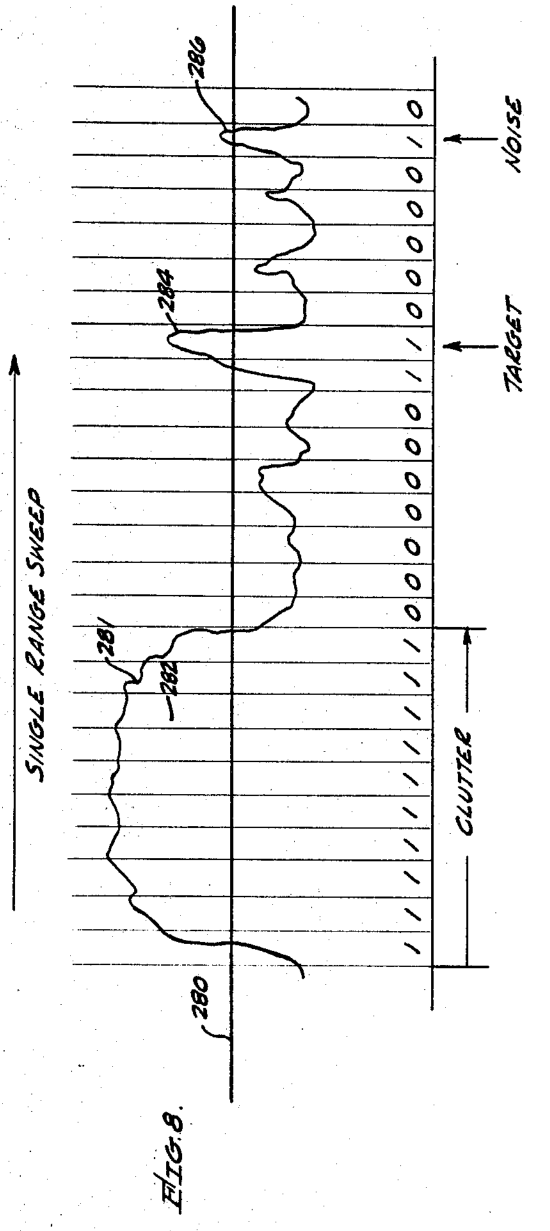
FIG. 8 is a schematic diagram of video amplitude as a function of time for explaining the quantizing operation of the video quantizer that may be utilized in the system of FIG. 1.

Referring now to FIG. 8 as well as to FIG. 1, the video quantizer 16 responds during each range sweep to the video return signal to develop a quantized video during each range bin interval as determined by the range counter 50. During each range bin time when the video signal 281 on the lead 14 is above a voltage threshold level 280, a binary "one" signal is applied to the OT1 flip-flop and when the video signal 281 is below the threshold level 280, a binary "zero" is applied to the OT1 flip-flop. A portion 282 of the range sweep continuing over 10 range bins is interpreted by the system as clutter and rejected. A target portion 284 of the video signal may during a single range sweep have two hits or "one" conditions and meet the target criteria if the condition continues in azimuth over a sufficient number of range sweeps. A noise area 286 may develop a single quantized "one," for example, in one range sweep. The video quantizer 16 is well known in the art and will not be explained in further detail.

Figure 9:
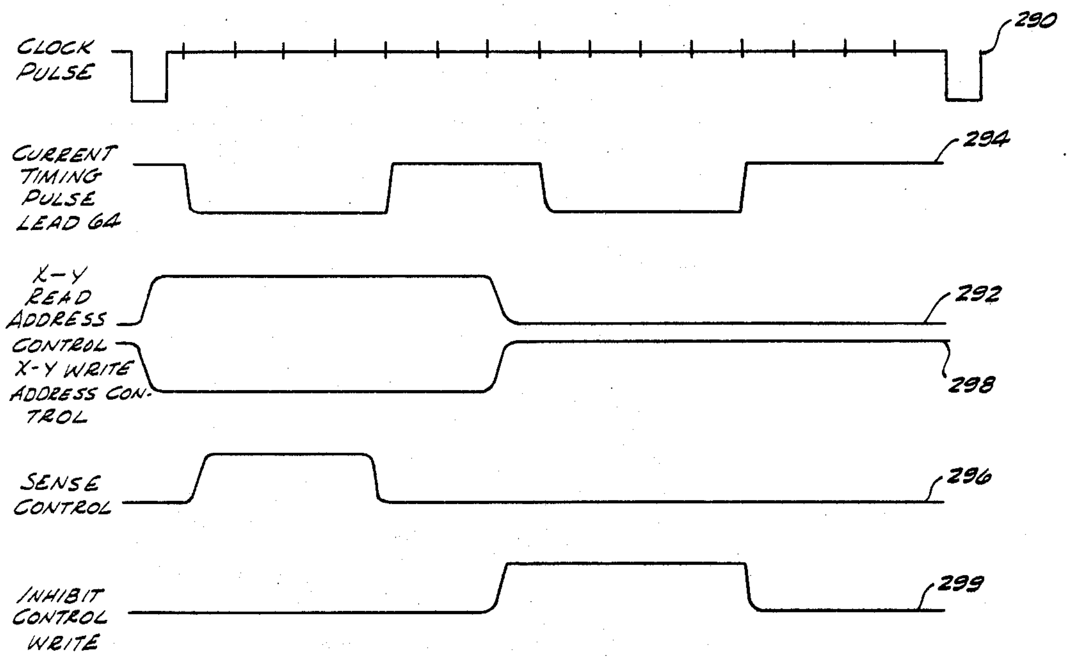
FIG. 9 is a schematic diagram of waveforms showing voltage amplitude as a function of time for explaining the operation of the sweep map memory system of FIG. 1.

Referring now to FIG. 9 as well as to FIG. 1, the memory timing operation will be explained in further detail relative to the system clock pulses of a waveform 290 which defines the interval of each range bin in response to the range counter 50. The memory timing circuit 60 which may include a logical flip-flop arrangement or a delay line circuit develops an X–Y read address control pulse of a waveform 292 on the lead 64 shortly after each system clock pulse to gate the range address from the range address register 46 to the memory array 34. The X–Y switching circuit 42 may include X and Y decoding networks for selecting an X drive line and a Y drive line in the array 34 for a word organized memory as is well known in the art. Shortly after the address is applied to the array, a negative current timing pulse of a waveform 294 is applied through the lead 66 to the switching circuit 42 to control a current source therein and pass half amplitude current pulses through the selected X and Y drive lines to change all of the selected cores to the zero states. Substantially at the same time as the pulse of the waveform 294, a sense control pulse of a waveform 296 is applied through the lead 74 to the sense amplifiers 72 for passing a negative signal (an interrogated "one") or the absence of a signal (an interrogated "zero") to each of the corresponding flip-flops P1 to P20 of the read register 36. At the termination of the read cycle, the pulses of the waveforms 294 and 296 are terminated as well as the address control pulse of the waveform 292, the write portion of the cycle being at a range address previous to that which reading was performed. The data which is presently stored in the write address register 48 corresponds to the data read at the previous address, that is, during the previous clock period. An X–Y write control pulse of a waveform 298 is then applied through a lead 70 to the write X–Y switching circuit 44 to apply a decoded address to the memory array 34 for selecting an X drive line and a Y drive line. After the addressing is completed, the inhibit or write pulse of a waveform 299 is applied through the lead 62 and the negative timing pulse of the waveform 294 is applied to the switching circuit 44 which applies an inhibit pulse through leads of the composite lead 31 corresponding to positions of significance at which the write information register 26 is storing a binary "zero." Inhibit pulses developed by the drivers 30 may prevent the writing of a "one," that is, effectively cause a "zero" to be written when coincident X–Y half amplitude current pulses are applied to all cores of the selected word. The switching circuits 42 and 44 may include gates so that current pulses are only developed in coincidence with an X–Y read or an X–Y write control pulse of waveforms 292 and 298 and a negative timing pulse of the waveform 294. Thus the memory system of FIG. 1 operates during a read-write cycle of each system clock interval to read from a first word address such as range bin 100 and to write information from the write register 26 into the previous word address such as range bin 99.

Figure 11:
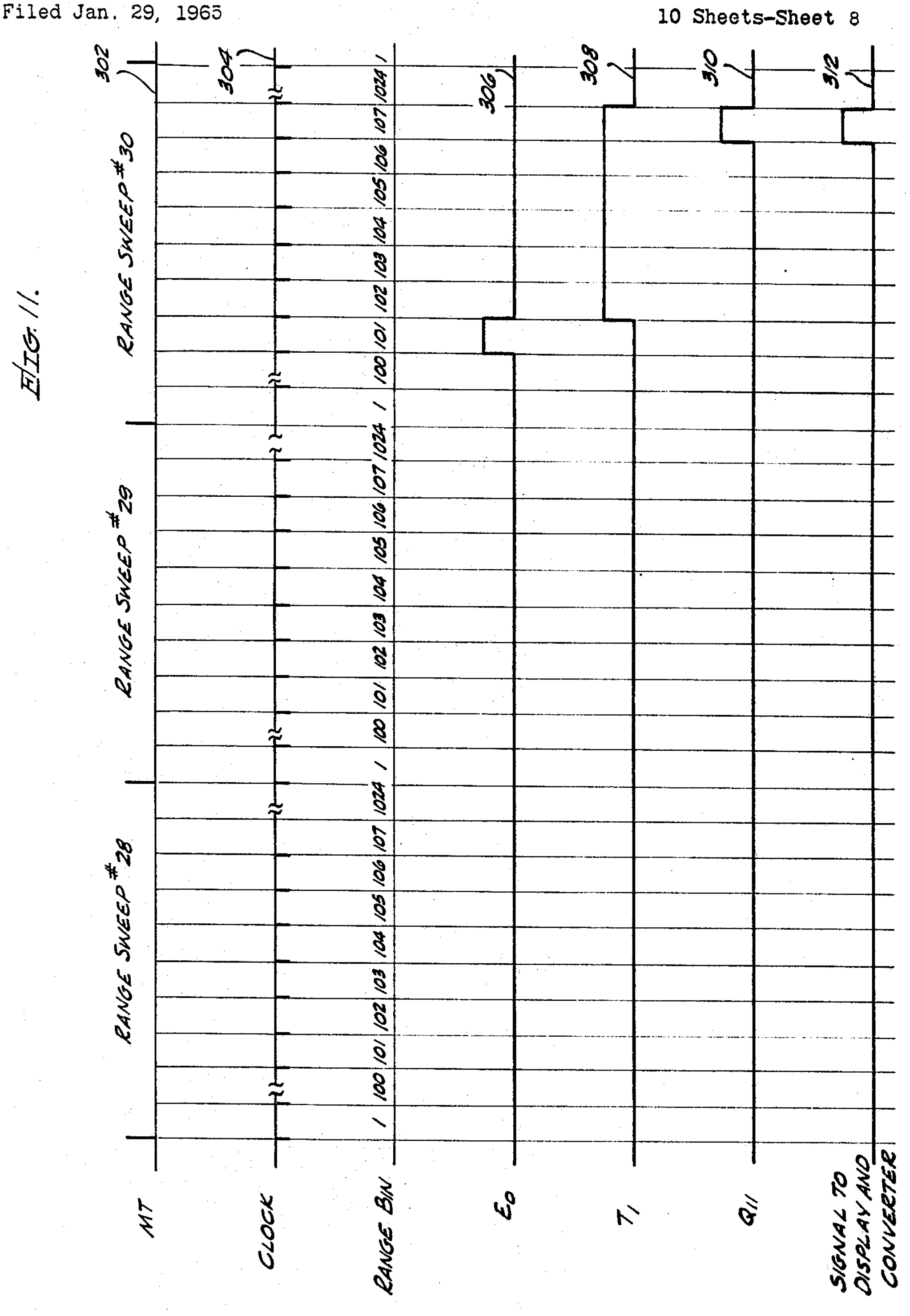
FIG. 11 is a schematic diagram of waveforms showing voltage amplitude as a function of time for further explaining the operation of the system of FIG. 1.
Figure 12:
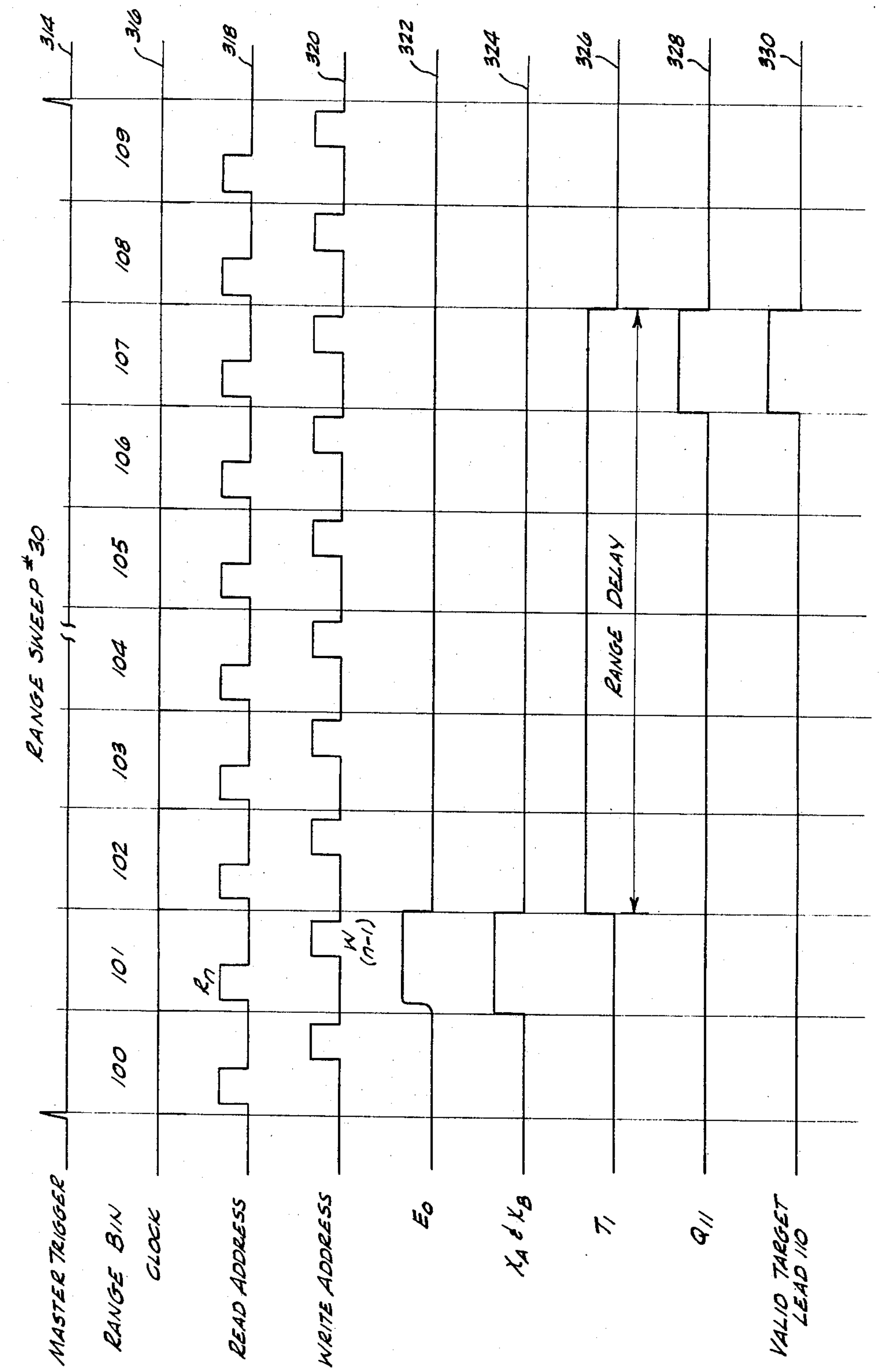
FIG. 12 is a schematic diagram of waveforms showing voltage amplitude as a function of time for explaining the operation of the system of FIG. 1.

Referring now to FIGS. 10, 11 and 12 as well as to FIG. 1, the operation of the target detection system of FIG. 1 will be explained in further detail. The master trigger signal of a waveform 302 is applied from the radar system 10 to the range counter 50 to reset the counter and initiate the counting of the range bins which may be 1024 during each range sweep period. During each range sweep, the system clock pulses of a waveform 304 define each range bin interval 1 to 1024 with a different word such as those corresponding to range counts 100 to 107 being read from the memory array 34 and the previously read word being rewritten from the write register 26 into the previously addressed word position. During each range sweep, the $E_0$ logic circuit 90 responds to a selected criteria such as 9 out of 11 "ones" read from the addressed word into the register 36 and in the example shown in FIG. 9 is satisfied during range sweep 30 as shown by a pulse of a waveform 306. It is to be noted that in the example of FIG. 10, the $E_0$ criteria of 9 out of 11 hits is not met until range sweep 30 and at range bin time 101. Also, during each range bin interval, the $K_0$ logic circuit 93 responds to determined if the criteria of 6 out of 11 "zeros" is met. As the $X_A$ and $X_B$ criteria are met during range sweep 30, the flip-flop T1 is set to the true state as shown by a waveform 308 and the signal $T_1$ is applied to the "and" target gate 106. At range time 106, the statistical range sample criteria is satisfied to set the flip-flop Q11 as shown by a waveform 310 at the next clock pulse and a valid target signal of a waveform 312 is applied through the target gate 106 to the display 118 as well as to the correlator and computer 114.

Referring now principally to FIGS. 1 and 12, the operation to meet the zero criteria in azimuth will be explained in further detail. The master trigger signal of a waveform 314 is shown to indicate the operation during range sweep number 30 when the bits are read into the read register 36 from the position shown in FIG. 10 to be detected in the position indicated by the sliding windows 216, 217 and 219. In response to the negative system clock pulse of a waveform 316 at the range bin time 100, the read address of a waveform 318 is applied to the memory to read the contents of the word 100 into the information register 86 and during the second half of the range bin time 100 the write address of a waveform 320 is applied to the memory to write the shifted word from the previous range bin interval into the memory word position 99. Each word position of the memory may be assigned an address equal to the count of the range counter 50 as stored in the read address register 46 for reading during that count interval. It is to be noted that during range bin time 100, the target hit criteria is not met and the $E_0$ pulse of a waveform 322 remains at its low level. During each clock period such as 100 the quantized video bit clocked into the flip-flop OT1 and into the write register during the previous range interval is written into the previous memory location or word position such as 99. Thus, the bit at each range interval stored in the flip-flop P20 is lost during each read write cycle as that bit is not clocked into the write register 26. At range bin time 101 the $E_0$ criteria of 9 out of 11 hits within the range window 216 is satisfied by the circuit 90 and the $E_0$ pulse of the waveform 322 is applied through the lead 92 to the flip-flop T1. At the same time, both $X_A$ and $X_B$ indicated by a waveform 324 are set true because the criteria of leading and trailing areas is met by 3 zeros out of 5. It is to be noted that $X_A$ and $X_B$ in the example is true at each range bin time 96 to 101 but the $E_0$ criteria has not been met at those times. In response to the next clock pulse of the waveform 316, the flip-flop T1 is set true at the start of the range interval 102 as shown by a waveform 326 indicating that the criteria of a target of a selected density with a sufficiently clear area on both sides in azimuth has been met. In range, the guard before criteria has been met but the guard after criteria is only determinable at the end of the range bin intreval 106. Thus, at the start of the range bin interval 107, the flip-flop Q11 is set true indicated by a waveform 328 and a valid target signal of a waveform 330 is applied from the "and" gate 106 to the display 118 and to the correlator and computer 114. It is to be noted that a time delay or range delay of 6 clock periods is required in the illustrated arrangement before the target signal of the waveform 330 is applied to the display and to the computer. However, as well known in the art, a fixed bias may be utilized in the computer for substantially determining the center of range of the detected target. A similar bias may be utilized in the display control circuitry for accurately indicating the target position on the display scope 118. In the azimuth dimension the determination of a valid target was not completed until range sweep 30 and a similar bias may be provided for indicating to the computer and the display the center of the target in the azimuth direction.

Referring now principally to FIGS. 1, 10, 11 and 13, the operation of the flip-flops Q1 to Q11 will be explained in further detail during the meeting of a valid target criteria in the range dimension. During range sweep 30 when the word of range bin time 96 is transferred to the read information register 36, the $K_0$ criteria of 6 zeros or more out of 11 is met as shown by a waveform 339 and at the next clock pulse of the waveform 344, the flip-flop Q1 is set to the true state as shown by a waveform 340. It is to be noted that the $K_0$ criteria may be met much earlier in range when a clear area is present and the flip-flop Q1 may be triggered to the true state at a much earlier range bin interval as indicated by the dotted portion of the waveforms such as 340. When the word of data storing the information of the range bin interval 97 is transferred to the register 36, the flip-flop Q2 is set to the true state as shown by a waveform 342 at the next clock pulse of a waveform 344. Similarly, at the end of the range bin interval 98, the flip-flop Q3 is set to the true state as shown by a waveform 345 as the $K_0$ criteria of the waveform 339 is continually satisfied. At the end of the range bin interval 99, the flip-flop Q4 is set to the true state as shown by a waveform 347 so that the flip-flops Q1 through Q4 are all set true. As discussed above, the flip-flops Q1 to Q4 may be set at a much earlier time in the range dimension and remain in that state because the $K_0$ criteria is continually present, that is, $\overline{K_0}$ is not true. During range bin interval 100, the $K_0$ criteria is not met and the $K_0$ signal falls to a lower level, that is, $\overline{K_0}$ is true, as shown by the waveform 339. However, range bin 100 is within the target area and the flip-flop Q4 being previously set, the flip-flop Q5 is set at the next clock pulse as shown by a waveform 346. Because $\overline{K_0}$ is true, the flip-flops Q1 to Q4 are reset at the end of range bin 100 as the guard before area criteria has been satisfied and in the event of an $E_0$ target, another guard before area criteria must be detected and met. Because a target may have a width in range of slightly more than one range bin interval, the two range bin intervals 100 and 102 are provided on each side of the sliding window 216. At range bin time 101 the gates of the flip-flop Q6 are set so that the flip-flop is set true at the next clock pulse as shown by a waveform 348. At range bin time 101, the $E_0$ signal of the waveform 350 is set true to set the flip-flop T1 as discussed relative to FIG. 6, the signals $X_A$, $X_B$ and $Q_4$, $Q_5$ or $Q_6$ being all true. Because $\overline{K_0}$ is always true when $E_0$ is true, the $\overline{K_0}$ true condition may occur in any one or all of the three target area range bins but will always occur when $E_0$ is true to reset the flip-flops Q1 to Q4. It is to be noted that in the example shown in FIG. 10, the range bins 100 and 101 are at the edges of the target and are provided so as to not affect the function of the guard before and guard after areas. The T1 flip-flop is reset if the flip-flops Q4, Q5 and Q6 are reset and $\overline{K_0}$ is true as shown in FIG. 6, that is, at the end of range bin interval 102 if an $E_0$ signal has not been developed in the target range bins 100, 101 102.

During range bin time 103 to flip-flop Q7 is set true as shown by a waveform 354 to provide a further delay. At the start of range bin time 104 the flip-flop Q8 is set true as shown by a waveform 356 in response to Q7 and the $\overline{K_0}$ criteria being true in the first range bin interval of the guard after area. At the start of range bin time 105 the flip-flop Q9 is set true and at the start of range bin time 106 the flip-flop Q10 is set true as shown by respective waveforms 358 and 360 indicating that the $K_0$ criteria is met in range bin intervals 104 and 105. At the start of range bin interval 107, flip-flop Q11 is set true as the $K_0$ criteria is met for the word read from range bin 106 and stored in the register 36 and the target signal of the waveform 330 (FIG. 12) is applied to the display and to the computer from the target gate 106 as the T1 flip-flop was set at the end of range bin 101. Thus, during range sweep 30, the $K_0$ range criteria is met and at the clock time at the end of the word corresponding to range bin 106, flip-flop Q11 is set. Flip-flop Q11 is reset at the end of range bin interval 107, and the system may detect another target by setting flip-flops Q1 to Q4, developing an $E_0$ in another target area to set flip-flop T1 when $X_A$ and $X_B$ are true, and meeting the criteria in the guard after area to set flip-flop Q11. It is to be noted that flip-flops Q1 to Q4 are always reset when $\overline{K_0}$ is true indicating a clutter or a fringe target area. The flip-flops Q8, Q9 and Q10, which may be set in the guard after area, are reset when $\overline{K_0}$ is true so that a sufficient decrease of zeroes in the guard after area requires the target detection criteria to again be performed. The flip-flops Q5, Q6 and Q7 which provide timing for the target area are reset at the next clock pulse after being set to the true state. It is to be noted that the $X_A$ and $X_B$ criteria of 3 zeros out of 5 range bins in azimuth must be met at the time $E_0$ is true for the flip-flop T1 to be set and a valid target signal to be passed through the gate 106. It is to be understood that although the target and clear conditions have been explained as areas, the system of the invention detects regions or volumes of target conditions in the sliding window surrounded by regions or volumes of statistical clear conditions because the antenna lobe or beam has height or elevation as is well known in the art.

Although the system of FIG. 1 has been explained with selected values of $E_0$, $K_0$, $X_A$ and $X_B$, it is to be understood that any desired statistical criteria may be utilized in accordance with the principles of the invention. Also the before guard area, the guard after area and the target area may have any desired number of range bins in accordance with the principles of the invention. The early azimuth area and the late azimuth area may extend over any desired number of range sweeps in accordance with the invention. Also in accordance with the principles of the invention, the sliding window for target detection may include any desired number of sweep intervals. It should be recognized that the principles in accordance with the invention are aplicable for target recognition with a three dimension track-while-scan radar which receives data in range azimuth and height or elevation.

In another arrangement in accordance with the principles of the invention an $E_0$ criteria may be utilized for a target and a selected portion of the $E_0$ criteria may be utilized for the occurrence of the azimuth guard area. For example, if 10 hits out of 11 samples are selected for the target criteria, 5 hits out of 11 samples or 6 zeros out of 11 samples may be selected for the guard area. Thus, in operation, the system determines a leading edge when a target criteria is met and does not determine the presence of a trailing edge until the lower criteria of 5 hits out of 11, for example, is met. This requires a memory bit in each word to store the fact that the leading edge hit criteria was met. This arrangement in accordance with the principles of the invention would prevent the detection of a trailing edge and an indication of a valid target during wide clutter regions. This arrangement does not require early and later azimuth guard areas so these memory bits can be eliminated. Also, the target width is not limited to one antenna beam width, but only one clutter track would be generated at the azimuth leading edge of a wide clutter area. A single erroneous target over a wide clutter region would greatly reduce the size of required computer memory and a non-moving target indication could be eliminated by other techniques such as a moving target indicator. Also in accordance with the invention, a similar bi-level statistical criteria may be utilized in the range direction.

For tracking large masses of a plurality of multiple targets such as a formation of aircraft, the system of FIG. 1 may be utilized by eliminating the sampling of the guard after area in range and azimuth. The output signal of the flip-flop Q11 and gate $X_A$ may be held at a true value by closing dotted switches 107 and 109 as shown in FIG. 1. The flip-flop Q5 of FIG. 5 may set and reset according to the following logical equations:

$$SQ6=Q5\cdot\overline{T_1}$$
$$RQ6=Q6$$

The flip-flop T1 of FIG. 6 may be set and reset according to the following equations:

$$ST1=E_0X_AX_B(Q_4+Q_5+Q6)\overline{T_1}$$
$$RT1=T_1$$

Thus a target condition is present to set flip-flop T1 when $E_0$ is true in a target region of FIG. 10 and a target indication is passed through the gate 106 of FIG. 1 when flip-flop T1 is set. This arrangement provides a target indication at the leading edge of a mass in range and azimuth. By suitable use of moving target indicators, the target signal can be further processed to determine if clutter or moving objects are present.

Thus there has been described a statistical zero target detection system that greatly eliminates false target signals by both pattern analysis and hit density analysis to require a clear area in both azimuth and range around a valid target. A target must be in a clear area with only noise hits in the surrounding space. The system in accordance with the invention operating with a surveillance radar system has been found to limit the number of total targets to an average of 80–100 per scan with about 50 of these being valid targets. Only 1 valid target per thousand, on the average, was erroneously rejected because of noise hits giving clutter indications. The system greatly reduces the number of targets that must be handled by the computer and correlator systems.

What is claimed is:

1. A system for statistically determining the presence of a target in space being responsive to quantized video signals received over a plurality of range intervals of each of a plurality of range sweeps comprising
   first means for determining the presence of a statistical target condition surrounded by a statistically clear region,
   and second means coupled to said first means for providing a signal representative of a statistically valid target.

2. A statistical target determining system responsive to quantized video signals received over a plurality of range intervals of each of a plurality of range sweeps at predetermined positions in azimuth comprising
   first means for determining the presence of a target condition with a substantially clear region on both sides thereof in the range dimension and with a substantially clear region on both sides thereof in the azimuth dimension,
   and second means coupled to said first means for providing a signal representative of a target.

3. A statistical target detection system responsive to video signals quantized as hits and misses during each of a plurality of range bin intervals of each of a plurality of range sweeps of a radar system comprising
   first means for detecting the presence of a target region of a selected statistical density of hits,
   second means for detecting the presence of a region of a selected statistical density of misses surrounding said target region,
   and third means coupled to said first and second means for developing a target signal when said target region and the region surrounding said target are detected.

4. A system for detecting the presence of targets in space being responsive to video signals quantized relative to a selected threshold level to first and second binary levels respectively representing a hit and a miss during each of a plurality of range bin intervals of each of a plurality of range sweeps of a radar system comprising
   first means responsive to the quantized binary signals for detecting the presence of a statistical target region of a selected number of hits in a region in space of a predetermined size,
   second means responsive to said quantized binary signals for detecting the presence of a selected number of misses in regions in space of a predetermined size around said target region,
   and third means coupled to said first and second means for developing a signal when said target region and said regions surrounding said target region are present.

5. A system for detecting the presence of targets in space being responsive to video signals quantized relative to a selected threshold level to first and second binary levels respectively representing a hit and a miss during each of a plurality of range bin intervals of each of a plurality of range sweeps of a radar system comprising
   memory means for storing the quantized binary signals over a predetermined number of range sweeps,
   first means coupled to said memory means and responsive to the quantized binary signals for detecting the presence of a statistical target region of a selected number of hits in a region in space of a predetermined size,
   second means coupled to said memory means and responsive to said quantized binary signals for detecting the presence of a selected number of misses in regions in space of a predetermined size around said target region,
   and third means coupled to said first and second means for developing a signal when said target region and said regions surrounding said target region are detected.

6. A statistical system for detecting a target in space comprising
   radar means for forming quantized video signals over a predetermined range and azimuth area in space,
   first means for determining the presence of a statistical target area,
   second means for determining the presence of a statistical clear area on both sides of said target area in azimuth,
   third means for determining the presence of a statistical clear area on both sides of said target area in range,
   and fourth means coupled to said first, second and third means for developing a valid target indication when a statistical target area is present and statistical clear areas are present on both sides of said target area in azimuth and in range, 7. A target detection system responsive to a radar system transmitting pulses of energy into space and developing quantized video signals during each of a plurality of range bin intervals repetitive over each of a plurality of range sweeps comprising
   memory means for storing the video signals at each range bin interval over a selected number of range sweeps,
   first statistical means coupled to said memory means for determining the presence in space of a statistical target region,
   second statistical means coupled to said memory means for determining the presence of a statistical clear region in space around said target region,
   and third means coupled to said first and second means for developing a valid target signal in response to the presence of said target region and said clear region.

8. A target detection system reponsive to a radar system developing quantized video signals during a plurality of range intervals repetitive during a plurality of range sweeps at different azimuth positions comprising first means coupled to the radar system for determining the presence of a target, second means coupled to the radar system for determining the presence of substantially clear areas in the range dimension at a lesser range and a greater range from said target, third means coupled to said radar system for determining the presence of a clear area on both sides of said target in the azimuth dimension, an fourth means coupled to said first, second and third means for indicating a valid target.

9. A target determining system operable with a radar system developing quantized video data during each of a plurality of range intervals repetitive during each of a plurality of range sweeps at different azimuth positions comprising memory means responsive to the radar system for storing the video data at each range interval over a plurality of range sweeps, first logical means coupled to said memory means for developing a signal representative of a statistical target region, second logical means coupled to said memory means for developing a signal representative of statistically clear regions around said target region, a target flip-flop coupled to said first and second means for responding to the signals developed thereby to develop a signal in response to a statistically clear region in azimuth on both sides of said statistical target region and a statistically clear region at a lesser range than said target region, counting means coupled to said second logical means for responding to the signals developed thereby to develop a signal in response to a statistically clear area at a greater range than said target area, and gating means coupled to said target flip-flop and to said counting means for responding to the signals developed thereby to develop a signal representative of a valid target.

10. A target detection system responsive to a radar system operating over an area in space of azimuth and range to develop quantized video bits at each of a plurality of range intervals in space over each of a plurality of azimuth positions in space comprising memory means coupled to the radar system for storing the quantized video bits at each range interval for a predetermined plurality of azimuth positions, first means coupled to said memory means for developing a first signal in response to a statistical target criteria in an area of predetermined size, second means coupled to said memory means for developing a second signal in response to a statistical zero criteria in an area of a predetermined size on a first side of said target area in azimuth, third means coupled to said memory means for developing a third signal in response to a statistical zero criteria in an area of a predetermined size on a second side of said target area in azimuth, fourth means coupled to said memory means for developing a plurality of fourth signals representative of statistical zero criteria in areas of predetermined size on first and second sides of said target area in range, fifth means coupled to said first, second, third and fourth means for responding to said first, second, third and fourth signals to develop a signal representing a clear area in both sides of said target area in azimuth and on said first side of said target area in range, sixth means coupled to said fourth means for developing a signal representing a clear area on said second side of said target area in range, and seventh means coupled to said fifth and sixth means for responding to the signals developed thereby to develop a valid target signal.

11. A system for detecting targets over a predetermined area in azimuth and range being responsive to a radar system transmitting pulses into space and developing quantized video signals during each of a plurality of range intervals repetitive over each of a plurality of range sweeps comprising an on-time flip-flop coupled to the radar system, memory means coupled to said on-time flip-flop for storing the quantized video signals at each range bin interval over a plurality of range sweeps, a read register coupled to said memory means, a write register coupled to said read register, to said on-time flip-flop and to said memory means, statistical target means coupled to said read register for determining the presence of a statistical target area in a range interval in space, first statistical zero means coupled to said read register and to said on-time flip-flop for determining the presence of a statistically clear area on a first side of said target area in azimuth, second statistical zero means coupled to said read register for determining the presence of a statistically clear area on a second side of said target area in azimuth, third statistical zero means coupled to said read register for determining the presence of statistically clear areas in each range interval on first and second sides of said target area in range, a target flip-flop coupled to said statistical target means and to said first, second and third statistical zero means for developing a first signal representing the occurrence of a target area, the statistically clear areas on both sides of said target area in azimuth and on the first side of said target area in range, counter means coupled to said third statistical zero means and to said target flip-flop for developing a second signal representative of a statistically clear area on said second side of said target area in range, and gating means coupled to said target flip-flop and to said counter means for developing a valid target signal in response to said first and second signals.

12. A target detection system responsive to a radar system transmitting pulses of energy into space and developing binary video signals during each of a plurality of range bin intervals repetitive over each of a plurality of range sweeps over a selected region in azimuth comprising a range counter for defining the range intervals, a magnetic core memory having a word position for each range interval and storing binary video over a predetermined number of range sweeps, said memory including a read address register and a write address register coupled to said range counter, a read information register coupled to said memory, a write information register coupled to said read information register and to said memory, an on-time flip-flop coupled to said write information register and to the radar system for receiving the binary video signals, a statistical target detection circuit coupled to said read information register for determining the presence of a statistical target region in a range bin interval in space, a late azimuth statistical circuit coupled to said read information register and to said on-time flip-flop for determining the presence of a statistical clear region on a first side of said target region in azimuth, an early azimuth statistical circuit coupled to said read register for determining the presence of a statistically clear region on a second side of said target region in azimuth, a range statistical circuit coupled to said read register for determining the presence of statistically clear regions in each range bin interval in space, a target flip-flop coupled to said early and late azimuth circuits, to said target detection circiut and to said range detection circuit for developing a first signal when said target region is detected, a selected first number of the clear regions in range are present and said clear regions in azimuth are present, counter means coupled to said target flip-flop, to said range statistical circuit for developing a first signal when said target region and a selected second number of the clear regions in range are present, and gating means coupled to said counter means and to said target flip-flop for responding to said first and second signals to develop a signal representative of a valid target.

13. A target detection system comprising radar means for transmitting pulses of energy into space at varying azimuth positions and responding to the return energy to develop quantized video signals during each of a plurality of range intervals over each of a plurality of range sweeps, a data flip-flop coupled to said radar means, a magnetic memory having a word position for each range bin interval for storing data over a predetermined number of range sweeps, said memory having a read address register and a write address register, a range counter for counting said range intervals coupled to said radar means, to said read address register and to said write address register for applying during each range count a first address to said read address register and a second address to said write address register corresponding to the word storing data from the previous range interval, a read information register coupled to said memory, a write information register coupled to said read information register, to said data flip-flop and to said memory, a first logic circuit coupled to said read information register for determining the presence of a statistical target region in a range window corresponding to a predetermined range interval over a selected number of range sweeps in space, a second logic circuit coupled to said read information register for determining the presence of a statistically clear region during each range window, a third logic circuit coupled to said read information register and to said data flip-flop for determining the presence of a statistically clear region on a first azimuth side of each range window, a fourth logic circuit coupled to said read information register and to said data register for determining the presence of a statistically clear region on a second azimuth side of said range window, counting means coupled to said second logical circuit for developing a first signal representative of predetermined clear regions in range, a target flip-flop coupled to said counting means and to said first, second, third and fourth logic circuits for developing a first signal representing the presence of said target region, said clear region on the azimuth sides of said range window and predetermined clear regions in range, and gating means coupled to said counting means and to said target flip-flop for developing a signal representative of a valid target.

References Cited

UNITED STATES PATENTS 3,307,184 2/1967 Poterack et al. -------- 343—5

RODNEY D. BENNETT, *Primary Examiner.*

C. L. WHITHAM, *Assistant Examiner.*